July 7, 1925.

W. F. FOLMER 1,544,970

LATCH, MULTIPLYING BACK FOR CAMERAS

Filed Aug. 22, 1924    2 Sheets-Sheet 1

FIG - 4 -

INVENTOR,
William F. Folmer,
BY
ATTORNEYS.

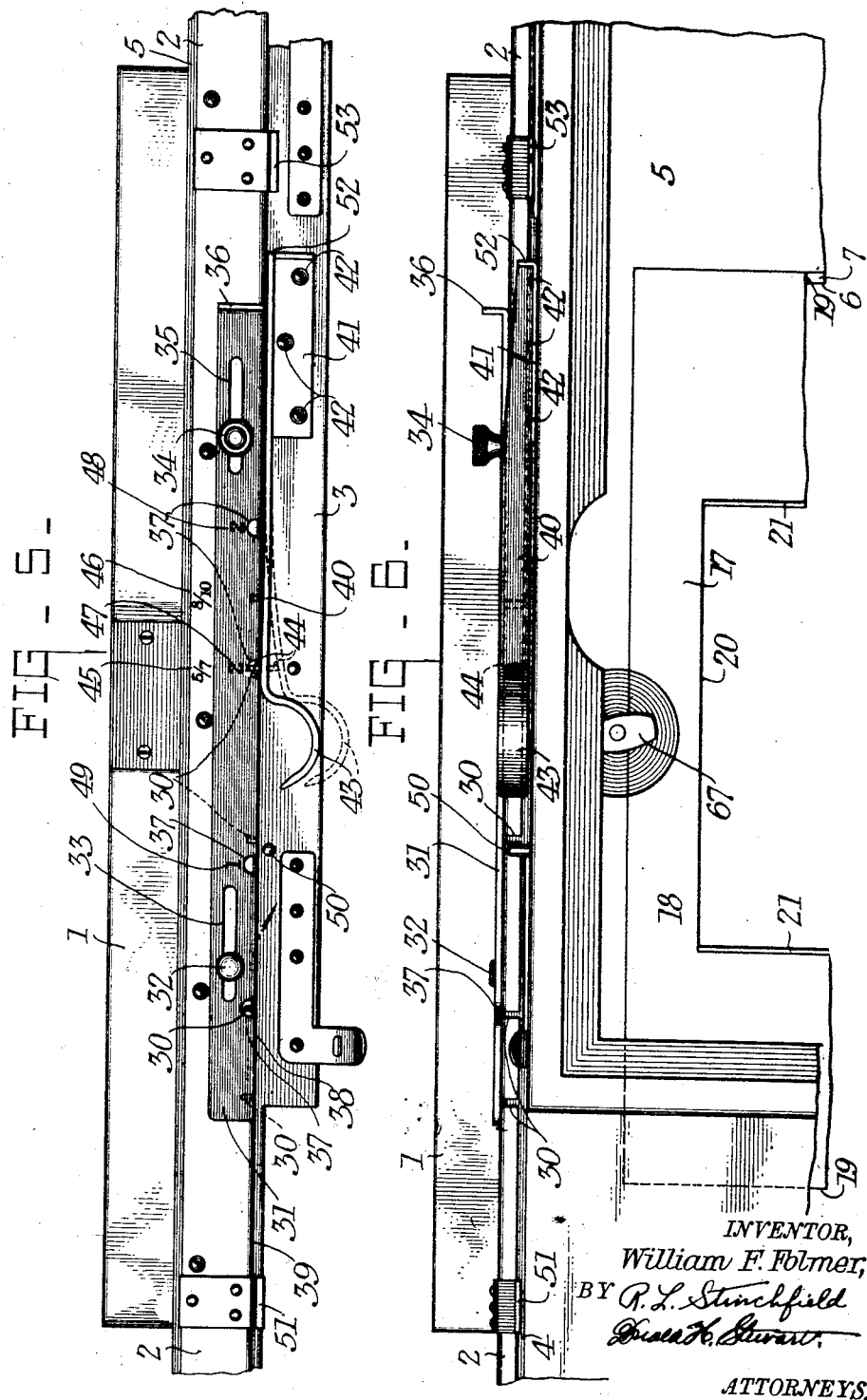

Patented July 7, 1925.

1,544,970

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

LATCH, MULTIPLYING BACK FOR CAMERAS.

Application filed August 22, 1924. Serial No. 733,652.

*To all whom it may concern:*

Be it known that I, WILLIAM F. FOLMER, a citizen of the United States of America, residing at Rochester, in the county of Monroe and State of New York, have invented certain new and useful Improvements in Latch, Multiplying Backs for Cameras, of which the following is a full, clear, and exact specification.

This invention relates to photography and more particularly to photographic camera construction. It has for its object to provide a suitable latch for multiplying back cameras; to provide a latch which can be set for latching the sliding frame in position for any desired size of picture; to provide a latch with which the same setting can be readily repeated or changed at will; and to provide a latch of the type described which can be readily applied to cameras which are now on the market.

This invention is for an improvement over the latch mechanism shown in my U. S. Patent No. 1,045,539 for multiplying back for cameras, of Nov. 26, 1912, wherein a similar type of camera equipped with a sliding back is shown.

In the drawings wherein like reference characters denote like parts throughout,—

Fig. 4 is a section on line 4—4 of Fig. 2;

Fig. 5 is an enlarged plan of the latching mechanism used on the camera shown in Fig. 1; and Fig. 6 is an enlarged fragmentary rear elevation of the latching structure shown in Fig. 5.

Figure 1:
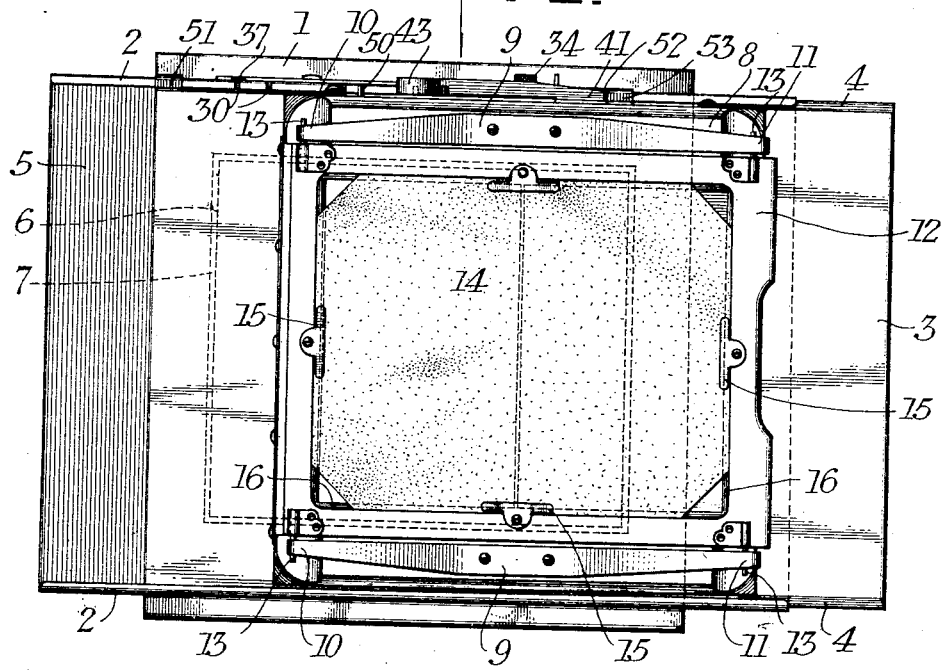
Fig. 1 is a rear elevation of a camera having the sliding back equipped with a latch constructed in accordance with and illustrating one embodiment of my invention.
Figure 2:
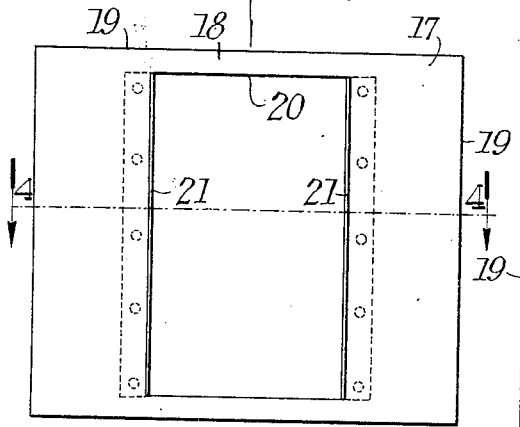
Figs. 2 and 3 are elevations of masks which may be used with the camera back illustrated in Fig. 1.
Figure 3:
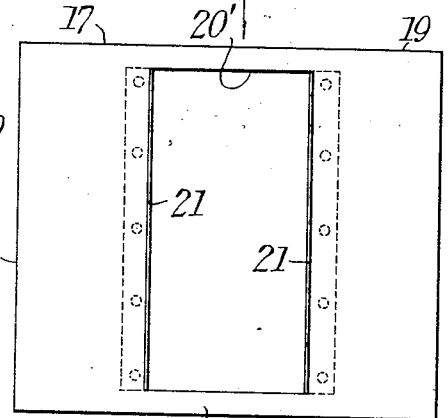

The back frame 1 of a view camera may be equipped with the rails 2 between which the sliding back 3 may move upon the flanges 4 which engage rails 2. Between the rails 2 there is a frame 5 which may be equipped with suitable light locking material and which carries a central opening 6 around which there extends a rabbet 7. The picture is taken through this opening. The sliding back 3 is equipped with a frame 8 which is centrally apertured and which carries the spring members 9 which support, at their ends 10 and 11, the ground glass frame 12 through the pins 13. A plate or film holder may be slid into an exposure position beneath the ground glass frame in the usual manner. The ground glass 14 is held in place in the rabbet 16 by metal clips 15. The rabbet 7 in the camera back is adapted to receive a mask 17 which consists of a frame 18 having a flanged edge 19 and a central opening 20. Flanges 21 may be provided on each side of the opening and a series of these masks with openings of different sizes is preferably provided, two different sizes being shown in Figs. 2 and 3. These masks may be placed in the rabbet 7 where they can be retained by turn buckles 67. As thus far described the structure of the camera is the standard construction of studio cameras used for making different sizes of pictures.

In order to properly position the sliding back 3 for different sizes of pictures I provide the latch mechanism shown on an enlarged scale in Figs. 5 and 6. One of the rails 2, here shown as the upper rail, is provided with a series of spaced notches 30. The number of these notches will, of course, vary to suit the sizes of pictures desired. In the present embodiment of my invention I am describing the structure used on a camera which is adapted to take one or two exposures on a 5 x 7 or on an 8 x 10 plate. Just above the rail 2 there is a latch controlling bar 31 mounted to slide upon the stud 32 which passes through a slot 33 and upon a nut 34, passing through slot 35. A handle 36 is provided for adjusting this bar which may be fastened in the desired position by nut 34. This bar carries a series of notches 37 and the edge 38 is substantially flush with the edge 39 of the rail 2.

The sliding back 3 is provided with a spring latch 40, this latch being formed up from a plate 41 attached by screws 42 to the back 3. There is a curved handle 43 on the end of the latch and a locking lug 44 adjacent the handle. The tension in the spring tends to press the lug 44 against the slideway formed by edges 38 and 39 and the lug 44 will drop into a notch 30 when a notch 37 carried by bar 31 registers with notch 30.

On the rail 2 there are index characters 45 and 46, in this case shown as indicating 5 x 7 and 8 x 10 as standard size films. When the bar 31 is moved so that the index character 47 is in line with character 45 this will indicate that the notches 30, which are in alignment with the notches 37 of bar 31, are the proper notches to permit the holder to move into position for two exposures on a 5 x 7 plate. Similarly when character 48 is brought into alignment with character 46 two sets of notches will be exposed and these too will register the frames properly for two exposures on an 8 x 10 plate.

Since the lug 44 slides on edges 38 and 39 it will ride on either edge 38 or edge 39 so that a notch 30 must be in registration with a notch 37 in order for the lug 44 to latch the two frames together.

Both frames must be centered for making single exposures on either a 5 x 7 or an 8 x 10 plate, so that I provide a single character 49, which may be brought into registration with a notch 30 to position the two frames for taking a single exposure on either sized plate. When the latch 40 is released the carriage may slide to the left (of Fig. 5) until the pin 50 strikes against bracket 51. In the other direction flange 52 strikes the bracket 53, thus preventing the sliding carriage from moving beyond a position in which it has a light tight connection with frame 5.

The operation of this latching device is practically automatic. When an 8 x 10 back is being used the latch controlling bar 31 may be set and fastened in position by a thumb nut 34 for taking the desired number of pictures on the plate. After once being set the operator merely pushes the sliding back back 3 from one latching position to another. It is not necessary to look at the back while doing this as only one set of notches is uncovered and is, therefore, in operative position at one time. By altering the position latching bar 31 may be set for a different number of exposures or for a different sized plate.

Having thus described my invention, what I claim as new and desire to secure by Letters Patent is:

1. In a multiplying back for cameras, the combination with two relatively movable frames, one of which is adapted to receive for exposure a sheet of photographically sensitive material, of cooperating latch members carried by the two frames, one latch member including a plurality of notches and the other latch member having a lug adapted to be received by any one of the series of notches, whereby one frame may be positioned in any one of a series of predetermined positions, and a movable latch controlling member adapted to render predetermined notches of the series inaccessible to the latching lug.

2. In a multiplying back for cameras, the combination with two relatively movable frames, one of which is adapted to receive a sheet of photographically light sensitive material, of cooperating latch members carried by the two frames, one latch member having a series of notches, and the other member including an arm carrying a lug adapted to be received by any one of the series of notches carried by the other latch member, and a movable latch controlling member adapted to move relative to the notched latch member and to render inaccessible certain of the notches whereby the latching lugs may be received by the notches remaining accessible.

3. In a multiplying back for cameras, the combination with two relatively movable frames, one of which is adapted to receive a sheet of photographically light sensitive material, of cooperating latch members carried by the two frames, one latch member consisting of an elongated strip notched at intervals and having a face forming a slideway, the other latch member consisting of a spring arm carrying a lug which is normally pressed against the slideway and is adapted to drop into the notches, and a slidably mounted latch controller adapted to cover certain notches in the slideway, having notches adapted to register with certain other notches in the slideway, whereby the latching lug will slide on the slideway or upon the latch controller except at such places as where the notches of the latching bar and controller coincide at which places the lug may engage a notch in the elongated guideway.

4. In a multiplying back for cameras, the combination with two relatively movable frames, one of which is adapted to receive a sheet of photographically light sensitive material, of cooperating latch members carried on the two frames, one latch member consisting of a notched bar, and the other latch member consisting of a spring latch carrying a lug adapted to engage a notch in the bar and to slide along the bar between the notches, and a slidable controlling member mounted adjacent the notched bar and having an edge against which the latch lug may slide, the controlling member being adapted to cover and uncover certain notches in the notched bar, thus preventing the lug from engaging a notch so covered.

5. In a multiplying back for cameras, the combination with two relatively movable frames, one of which is adapted to receive a sheet of photographically light sensitive material, of cooperating latch members carried on the two frames, one latch member consisting of a notched bar, and the other latch member consisting of a spring latch carrying a lug adapted to engage a notch in the bar and to slide along the bar between the notches and a controlling bar, slidably mounted on the notched bar and having a portion substantially flush with the face of the notched bar, the lug on the spring being adapted to engage both the above mentioned bars, said controlling bar being notched at intervals, whereby the lug may engage and latch the two frames together by dropping into a notch in the notched bar with which a notch in the controlling bar is registered.

Signed at Rochester, New York, this 18 day of August, 1924.

WILLIAM F. FOLMER.